I. H. RICE.
Wheel Cultivator.

No. 52,606. Patented Feb. 13, 1866.

Witnesses:

Inventor:

UNITED STATES PATENT OFFICE.

HARRISON RICE, OF SPRINGFIELD, OHIO.

IMPROVEMENT IN CULTIVATORS.

Specification forming part of Letters Patent No. 52,606, dated February 13, 1866.

*To all whom it may concern:*

Be it known that I, HARRISON RICE, of Springfield, in the county of Clarke, in the State of Ohio, have invented a new and useful Improvement in Cultivators; and I do hereby declare that the following is a full and exact description thereof, reference being had to the accompanying drawings, and to the letters of reference marked thereon.

Figure 1:
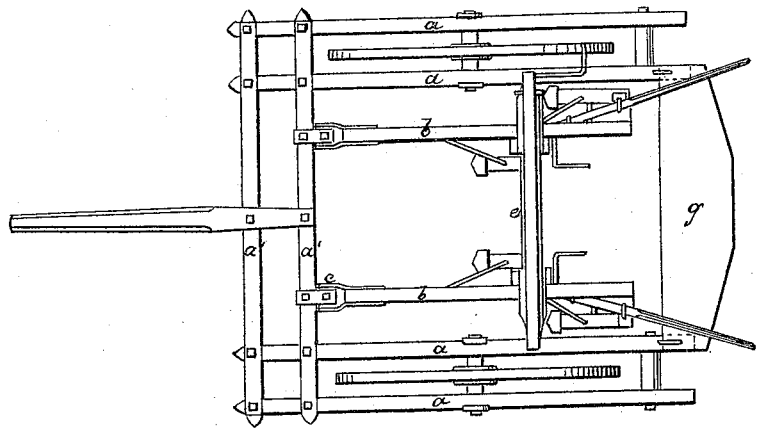
Figure 2:
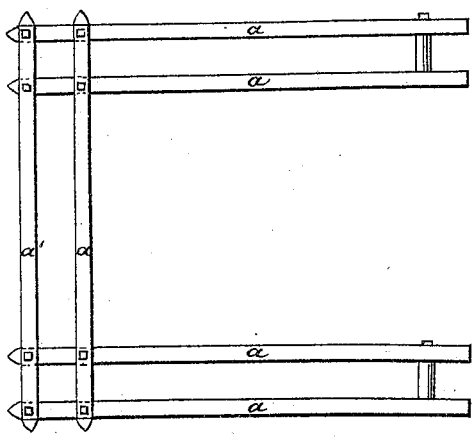
Figure 3:
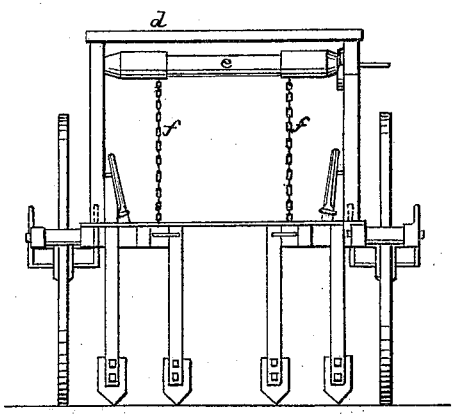

Figure 1 is a top view of the machine complete. Fig. 2 represents the main frame of the machine with the driver's removable seat detached. Fig. 3 represents a rear elevation of the machine with the windlass and its frame.

In the drawings, $a\ a$ represent the main frame of my improved cultivator supported upon two wheels. The wheels have their axles in slotted adjustable bearings, which admit of adjustment vertically, so as to regulate the height of the frame.

The front frame-pieces, $a'\ a'$, have the tongue bolted to them, and to the inside frame-piece, $a'$, the plow-beams $b\ b$ are fastened by the universal joints $c\ c$. The plow-beams are furnished with suitable plows, as seen in the drawings.

A frame, $d$, consisting of two posts fastened to the two inside frame-pieces, $a\ a$, behind the axles of the wheels, with a plate or tie connecting them at the top, is furnished with the windlass $e$ and chains $f\ f$, for the purpose of suspending the plows at different elevations to suit different kinds of work. The windlass is provided with a ratchet-wheel and pawl, by which the various adjustments vertically of the plows are effected. Any desired form of plow may be attached to the plow-beams.

The crank of the windlass is at the right-hand side of the machine, for convenience for the driver, who may readily elevate the plows in passing over stumps or other obstructions in the field.

It will be seen in the drawings that the main frame consists of the two front pieces, $a'\ a'$, and the four side pieces, $a\ a\ a\ a$, and between the latter the wheels are placed. The rear end of the main frame is disconnected, except by the removable seat $g$ for the driver.

The double frame $a\ a'$ is strongly made and the parts firmly secured together by bolts, so as to retain its form and perform its functions without being connected at the rear end thereof.

In using my improved cultivator for plowing corn, the horses will be guided so as to direct the tongue of the machine over a corn-row, which will cause the plows to cultivate the ground on each side of the corn-row at the same time. The plows being connected with the front frame, $a'\ a'$, by the swivels or universal joints, and suspended from the windlass by chains, will enable the driver to guide them with the greatest ease and facility, whereby any necessary lateral motion may be given to the plows so as to throw the earth to or from the corn, and so as to follow the irregularities of a crooked row, which capabilities in corn-cultivators will be readily appreciated by farmers. This mode of suspending the plows has also the advantage of a ready means of graduating the depth of furrow according to the height of the corn and amount of cultivation necessary at any stage of its growth.

One of the leading features of my improvement in cultivators consists in the use of the removable seat $g$ for the driver. The driver may sit between the two plow-handles upon his seat, the carrying-wheels being so adjusted as to give the proper depth to the action of the plows, while the handles will rest upon the driver's seat, and the driver's labors are much lessened, he having merely to guide the plows laterally when the corn-row is irregular and in passing obstructions, while at other times the seat will support and guide the plows; but the suspension-chains will also serve this purpose, either when the seat is attached or removed from the machine.

One great practical advantage of my improved construction of the main frame and seat is in the fact that the driver may ride or walk in using my machine, and in either case he has equally free access to the plow-handles and windlass. When sitting upon the seat his feet may be placed in stirrups fastened to the plow-beams, and when on foot or walking he must grasp the two plow-handles.

It will be observed that the plow-beams are so connected to the front frame-piece, $a'$, as to be swayed laterally some distance without striking the side frame-pieces, $a$.

It will appear readily that in a machine like mine, with a vertically-adjustable frame and adjustably-suspended plows, the tongue may be rigidly secured to the main frame, not requiring any changes of position.

Having fully described the construction and manner of operating or using my improved cultivator, what I claim therein as my invention, and desire to secure by Letters Patent, is—

1. The combination of the three-sided double frame $a\ a, a\ a$, and $a'\ a'$ with the removable seat $g$ and adjustable axle-bearings, in the manner described, for the purpose specified.

2. The combination of the main frame with the vertical frame $d$, windlass $e$, chains $f$, and joints $c\ c$, arranged and operating conjointly in the manner substantially as described, for the purpose specified.

In testimony whereof I have hereunto set my hand this 20th day of September, 1865.

HARRISON RICE.

Witnesses:
 WM. WHITELEY,
 A. GONEY.